March 2, 1954  G. W. RIENKS ET AL  2,670,846
APPARATUS FOR SCREENING SUGAR BEETS AND THE LIKE
Filed Dec. 11, 1947
Fig. 1.
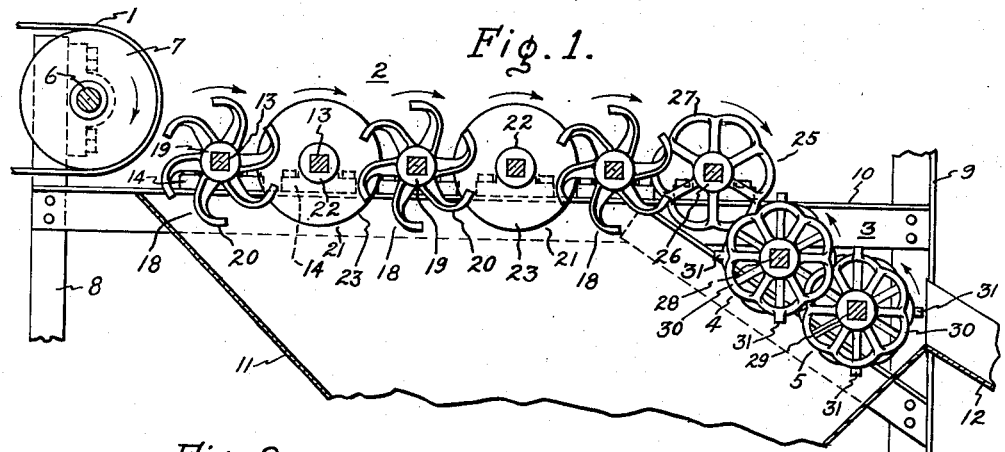
Fig. 2.
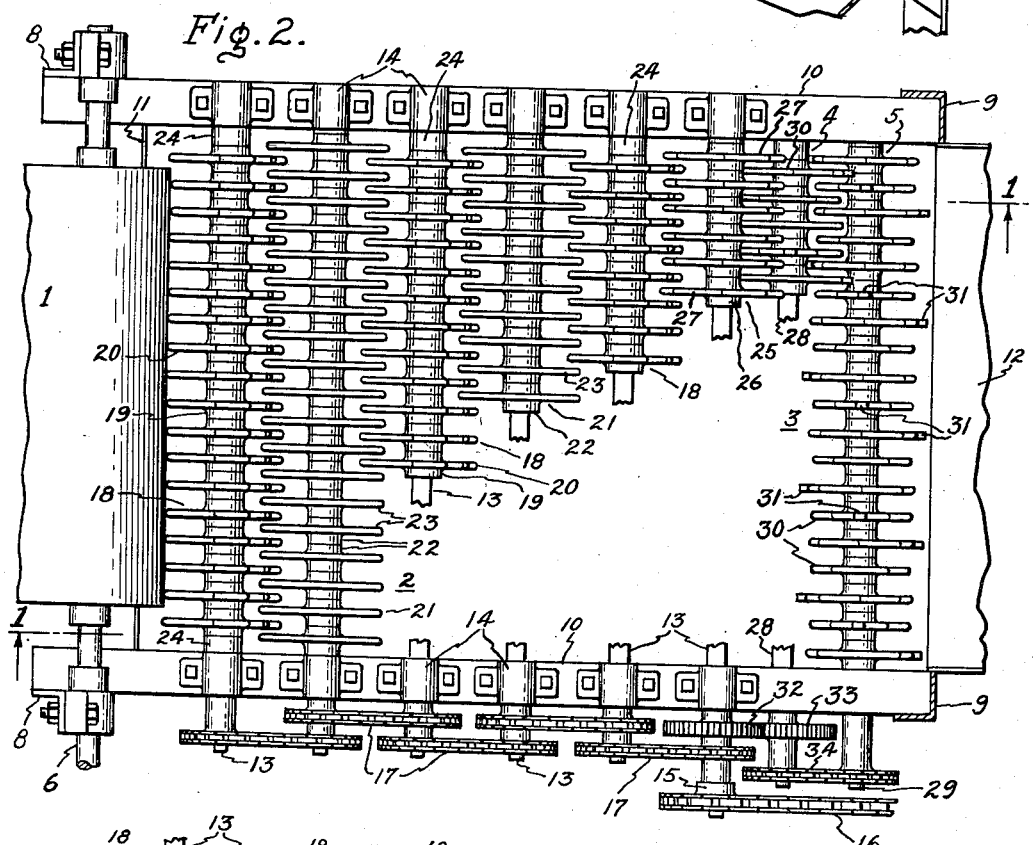
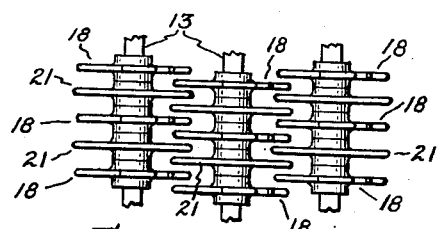
Fig. 3.
Inventors:
George W. Rienks,
Harold F. Silver,
by
Their Attorney Patented Mar. 2, 1954

2,670,846

UNITED STATES PATENT OFFICE 2,670,846

APPARATUS FOR SCREENING SUGAR BEETS AND THE LIKE

George W. Rienks and Harold F. Silver, Denver, Colo.

Application December 11, 1947, Serial No. 790,960

1 Claim. (Cl. 209—104)

This invention relates to screening apparatus and particularly to such apparatus for separating dirt and foreign matter from agricultural products such as sugar beets.

The present invention is an improvement on the invention disclosed and claimed in U. S. Letters Patent No. 1,899,292 granted to George W. Rienks. Screening apparatus of the type disclosed in the Rienks' patent has proved highly satisfactory in the separation of dirt and leafy matter from sugar beets particularly when the material is dry. However, when the earthy matter is wet and particularly when it is of a muddy consistency or includes small rocks, difficulty has been encountered in effectively cleaning the beets. Accordingly, it is an object of the present invention to provide a screening apparatus for sugar beets and the like including an improved arrangement for removing dirt and foreign matter from the beets or other articles to be cleaned.

It is another object of this invention to provide a screening apparatus for effectively removing earthy matter of muddy consistency from sugar beets and the like and preventing delays due to rocks wedging between the elements and stopping the screen.

It is a further object of this invention to provide a screening apparatus of the rotating type for sugar beets and the like, including an improved construction for facilitating the handling and removal of rocks and similar rigid bodies with minimum danger of damage or delay to the apparatus or of injury to the beets.

With the above and other objects in view, this invention comprises the combinations and arrangements of devices hereinafter described with reference to the accompanying drawing in which:

Fig. 1 is a side elevational view, partly in section, of a screening apparatus embodying the invention;

Fig. 2 is a plan view, partly broken away, of the apparatus of Fig. 1; and

Fig. 3 is a fragmentary view of an apparatus similar to that of Figs. 1 and 2, illustrating a modification of the invention.

Briefly, the apparatus shown in the drawing, and which will be described in detail below, comprises a screening table of the grizzly type which is made up of a series of rotary units driven to revolve in the same direction. Each of the units is constructed with a series of spaced agitators or rotary elements overlapping and staggered with respect to those of adjacent units. The spacing of the agitators is such that sugar beets or similar products cannot pass therebetween and, as the mass of beets to be cleaned moves over the screen, the associated dirt and trash falls through the screen. In order to clean sugar beets and other products which have muddy materials adhering to them, the screen is arranged to produce combined agitating and impelling actions. In one embodiment, every other rotary unit is made up of especially formed agitating members and the intermediate rotary units are made up of disks. In a modified form, agitating members and disks are arranged alternately on each rotary unit.

Referring now to the drawing, the screening apparatus shown in Figs. 1 and 2 comprises a feed belt 1 for supplying the beets or other material to be cleaned to a main screening unit 2 which includes a plurality of rotary material moving members arranged to rotate in the same direction and to convey the material toward an auxiliary screening unit 3 formed of two rotary members 4 and 5 arranged to rotate in the opposite direction from that of the members of the main unit. The belt 1 is driven by a suitable motor (not shown) which is connected to drive a shaft 6 on which a belt supporting roller 7 is mounted. The roller and its shaft together with the main and auxiliary screening units are mounted on a structural framework including pairs of vertical members or posts 8 and 9 and connecting horizontal side bars 10. Suitable cross braces (not shown) are provided to form a rigid rectangular framework. The dirt and foreign matter falling through the screening units is collected in a hopper or delivery chute 11, and the cleaned beets are delivered from the auxiliary unit to a discharge chute 12.

In the apparatus shown, the main screening unit 2 comprises six rotary material moving units mounted on parallel shafts 13. The shafts 13 are journaled in bearing boxes 14 attached to the tops of the side bars 10. All the shafts project beyond their bearing boxes at one side of the apparatus and are provided with driving connections to rotate the six shafts simultaneously in the same direction. In order to connect the driving motor, the right-hand end shaft 13 is made to extend farther to the side of the frame than the others to receive a driving sprocket 15 connected by a chain 16 to the motor (not shown). A second sprocket on the right-hand shaft 13 drives all the remaining shafts 13 through sprockets of the same diameter connected by a series of sprocket chains 17. Thus, all the shafts 13 are driven simultaneously in a clockwise direction as viewed in Fig. 1.

Alternate ones of the material moving units of the main screening unit are of different types; the first, third and fifth units being material agitating units; the second and fourth being material disk units; and the sixth being a different type of agitating unit, as shown, or alternatively may be a disk unit. It has been found that by subjecting sugar beets or similar material to a combined agitating and impelling action as it moves over the screen, it is possible to remove earthy matter even when it is of a muddy consistency. The first three agitating units are formed by mounting a series of agitating members 18 on the first, third and fifth shafts 13. Each member 18 comprises a hub 19 and six radial curved arms 20, the arms being curved away from the direction of rotation so that each arm presents a rounded kicker projection to the material passing over the screen. The disk units are constructed by mounting a series of plain disks 21 on the second and fourth shafts 13. Each disk comprises a hub 22 and an outwardly extending flat portion 23. The disk members are made of the same diameter as the agitating members, and the shafts 13 are spaced at distances less than this diameter so that the agitating and disk members overlap. The members on adjacent shafts are staggered as clearly shown in Fig. 2, spacing collars 24 being arranged at the two ends of alternate shafts 13 to maintain the staggered relationship. The last agitating unit on the right-hand end of the main unit 2 may comprise a series of agitating wheels 25 having hubs 26 and scalloped rims 27 presenting rounded projections to the material being screened. The wheels 25 are spaced and staggered in the same way as the other members and overlap the agitating members 18 on the adjacent shaft 13. Discs 21 may be substituted for the wheels 25 if desired, and in some instances constitute a more effective structure.

The agitating members 18 may be formed from elastoplast material. According to Hackh's Chemical Dictionary, third edition, 1944, elastoplast is a substance having both elastic and plastic properties.

This final unit of the main screen imparts a less violent kicking action than the wheels 18, and delivers the beets to the auxiliary screen 3, both units 4 and 5 of which rotate in the opposite direction, that is, counterclockwise as viewed in Fig. 1.

The units 4 and 5 are mounted on shafts 28 and 29, respectively, supported at their ends in a suitable frame (not shown), and each unit comprises a series of scalloped wheels 30 which are of substantially the same shape as the wheels 25. Furthermore, each of the wheels 30 is provided with a short kicker lug 31 at its rim. The lugs 31 of adjacent wheels 30 on each of the shafts 28 and 29 are rotated ninety degrees so that they lie in a helical path about the units 4 and 5. The shaft 28 is driven from the end shaft 13 by gears 32 and 33 which reverse the direction of rotation. The shaft 29 is driven in the same direction as the shaft 28 by suitable sprockets and a sprocket chain 34. These reversely rotating units of the auxiliary screen effect the final separation of dirt or other foreign matter from the treated articles.

The spacing of all the material moving members on the several shafts and the spacing of the shafts from one another is such that the beets or large pieces thereof cannot pass through the spaces between the members and are therefore carried along continuously from one end of the apparatus to the other. The slope or pitch of the auxiliary screening unit is such that the beets continue toward the discharge chute although lighter material is picked up and rejected by the units 4 and 5.

In the drawing all the agitating units 18 have been shown with their arms 20 in alinement in order to avoid complication of the drawing; however, adjacent arms are preferably rotated ninety degrees in the same manner as the lugs 31 of the wheels 30. This provides a better distribution of the arms 20 over the screening surface, and decreases the opportunity for beets to become lodged in the screen.

During the operation of the apparatus the beets delivered from the belt 1 move over the main screening unit and pass alternately from an agitating section to a disk section. This action is such that dry earth and other material is readily separated from the beets, but it also readily removes wet material and masses of mud. Thus the apparatus may be employed effectively during either dry or wet weather, and drying of the beets before screening is not necessary. The arrangement of alternate agitators and disks thus provides a simple and effective arrangement for increasing the utility of the rotary type screening apparatus and prevents wedging action from rocks.

In Fig. 3 there is illustrated another embodiment of the invention involving a different arrangement of the agitating members 18 and disks 21 on the shafts 13. In this arrangement both disks and agitating members are mounted on each of the shafts alternately along the length of the shaft. Thus it will be observed that beets or other articles moving along the screen are subjected to both agitating and impelling action by each shaft; but also that beets moving along a given line may contact agitating and disk surfaces alternately as they move from one rotating unit to the next. Thus in this apparatus as well as that of Fig. 1 the material is subjected to a combined agitation and impelling action.

Although the screening apparatus has been described as comprising six rotary units in the main screening section, it will be understood that the number of units is to be selected in accordance with the particular work to be done in any case. Furthermore, the construction and arrangement of the auxiliary screening unit may be varied to suit specific conditions of operation; for example, the slope of the auxiliary rotary units may be varied according to the characteristics of the products to be handled.

During the continuous handling of large quantities of sugar beets and similar products, rocks and other hard bodies are apt to be delivered to the apparatus. In order to facilitate the handling of such bodies and also to increase the effectiveness of the screening action of the disks in removing mud from the beets, the several forms of agitating members and also the disks may be constructed of a readily flexible material, such as rubber. Not only does this rubber construction help the screening action but also there is much less chance of damage to the beets which are sometimes broken when struck by rigid agitating members or kickers.

From the foregoing it is readily apparent that there has been provided a simple and easily constructed apparatus for effectively removing earth, mud, or other foreign matter from sugar beets and the like. Furthermore, the apparatus reduces the time required for servicing the screening devices due to breakage, and also decreases the breakage of the beets or other products handled by the apparatus.

Although specific embodiments have been illustrated and described, other arrangements will occur to those skilled in the art. It is not, therefore, desired that the invention be limited to the particular constructions shown and described and it is intended by the appended claim to cover all modifications within the spirit and scope of the invention.

Having thus described the invention, what is claimed is:

A screening apparatus for sugar beets and the like comprising a plurality of spaced parallel shafts mounted for rotation in the same direction, a plurality of conveyor members formed of elastoplast material having a laterally thick hub and a centrally disposed and radially extended disk adapted to be mounted on said shafts, a plurality of agitating members formed of elastoplast material having laterally thick hubs and centrally disposed kicker arms, each of said kicker arms comprising a substantially radial portion extending from the hub and a terminal portion curved rearwardly relative to the direction of rotation of said agitating members substantially at right angles to said radial portion and adapted to be mounted on the shafts of said apparatus, said conveyor members and said agitating members being of a diameter greater than the distance between adjacent shafts, and said agitator members and conveyor members being positioned on said shafts with the kicker members mounted on one shaft disposed adjacent to disk members mounted on an adjacent shaft, said conveyor and agitator members being disposed in staggered relation to provide passages downwardly through said apparatus for the escape of dirt, rocks and debris, said passages being of greater total cross sectional area than the total cross sectional area of said disks and said agitator arms, and each of the individual passages formed between said disks and kicker arms being adapted to receive and pass rocks or the like of substantially greater dimension than the said passage due to the deformation of said disks and kicker arms.

GEORGE W. RIENKS.
HAROLD F. SILVER.

References Cited in the file of this patent

UNITED STATES PATENTS

| Number | Name | Date |
| --- | --- | --- |
| 814,346 | Benjamin | Mar. 6, 1906 |
| 1,524,360 | Lauritzen | Jan. 27, 1925 |
| 1,641,777 | Newhouse | Sept. 6, 1927 |
| 1,699,718 | Robins | Jan. 22, 1929 |
| 1,899,737 | Ulrich | Feb. 28, 1933 |
| 1,941,147 | Johlige | Dec. 26, 1933 |
| 2,257,352 | Silver | Sept. 30, 1941 |

FOREIGN PATENTS

| Number | Country | Date |
| --- | --- | --- |
| 608,375 | Germany | Jan. 22, 1935 |
| 65,050 | Norway | Nov. 9, 1940 |